(12) United States Patent
Chen et al.

(10) Patent No.: US 7,532,572 B2
(45) Date of Patent: May 12, 2009

(54) PACKET COMMUNICATIONS SYSTEM, BASE STATION AND MOBILE STATION

(75) Inventors: Lan Chen, Yokohama (JP); Daisuke Kitazawa, Kawasaki (JP); Hidetoshi Kayama, Yokohama (JP); Narumi Umeda, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 806 days.

(21) Appl. No.: 10/845,351

(22) Filed: May 14, 2004

(65) Prior Publication Data
US 2005/0025056 A1 Feb. 3, 2005

(30) Foreign Application Priority Data
May 16, 2003 (JP) ............. P 2003-139588

(51) Int. Cl.
*H04B 7/204* (2006.01)
*H04J 3/14* (2006.01)

(52) U.S. Cl. .......... 370/230; 370/329; 370/341; 370/349

(58) Field of Classification Search .......... None
See application file for complete search history.

(56) References Cited

U.S. PATENT DOCUMENTS

| | | | |
|---|---|---|---|
| 6,414,943 B1* | 7/2002 | Hwang et al. ........... | 370/310 |
| 6,842,619 B2* | 1/2005 | Lee et al. ............... | 455/453 |
| 6,850,509 B2* | 2/2005 | Lee et al. ............... | 370/336 |
| 6,865,169 B1* | 3/2005 | Quayle et al. ........... | 370/335 |
| 7,003,302 B2* | 2/2006 | Yoshida et al. .......... | 455/450 |
| 2003/0081664 A1* | 5/2003 | Lu et al. ................ | 375/222 |
| 2003/0120802 A1* | 6/2003 | Kohno ................... | 709/237 |
| 2003/0133457 A1* | 7/2003 | Ono et al. .............. | 370/395.4 |
| 2003/0231598 A1* | 12/2003 | Venkataraman et al. ..... | 370/252 |

FOREIGN PATENT DOCUMENTS

| JP | 2000-232402 | 8/2000 |
|---|---|---|
| JP | 2002-171573 | 6/2002 |

* cited by examiner

*Primary Examiner*—Chi H. Pham
*Assistant Examiner*—Soon D. Hyun
(74) *Attorney, Agent, or Firm*—Oblon, Spivak, McClelland, Maier & Neustadt, P.C.

(57) ABSTRACT

In a packet communications method of performing packet communications between a mobile station and a base station, the base station manages an amount of packets stored in a transmission buffer of the mobile station. The mobile station notifies a changed result of an amount of packets stored in the transmission buffer of the mobile station, when the amount of packets stored in the transmission buffer of the mobile station changes. The base station changes a managed amount in accordance with the changed result notified from the mobile station.

13 Claims, 10 Drawing Sheets

PACKET COMMUNICATIONS SYSTEM, BASE STATION AND MOBILE STATION

CROSS REFERENCE TO RELATED APPLICATION

This application is based upon and claims the benefit of priority from the prior Japanese Patent Application No. P2003-139588, filed on May 16, 2003; the entire contents of which are incorporated herein by reference.

BACKGROUND OF THE INVENTION

1. Field of the Invention

The present invention relates to a packet communications method of performing packet communications between a mobile station and a base station. The present invention relates to a base station and a mobile station which can implement the packet communications method.

2. Description of the Related Art

Conventionally, an "HSDPA (High Speed Downlink Packet Access)" method which is a downlink high-speed packet communications method is formally specified in a 3GPP ($3^{rd}$ Generation Partnership Project).

To be more specific, an "RR (Round Robin)" scheme, a "Max C/I (Maximum Carrier/Interference)" scheme and the like are proposed as a scheduling scheme in the downlink high-speed packet communications method.

In the conventional downlink high-speed packet communications method, a transmission buffer (a queue) corresponding to each mobile station is provided in a base station, so that the base station can perform efficient scheduling processing in consideration of an arrival time of downlink packets, a size of the transmission buffer (a length of the queue) and the like.

On the other hand, in the conventional uplink high-speed packet communications method, a transmission buffer of each mobile station is provided in the mobile station.

Therefore, a scheme in which each mobile station periodically reports an amount of packets stored in the transmission buffer to the base station so that the base station can perform the scheduling processing are proposed.

However, there is a problem in that each mobile station requires a lot of "notification bits" to report the amount of packets stored in the transmission buffer, so that system efficiency is reduced due to a control load, in the conventional uplink high-speed packet communications method.

There is a problem in that a dynamic change of an amount of packets stored in the transmission buffer, which is caused by an occurrence of packets to be transmitted, an occurrence of packet discard and the like, can not be reflected to the base station in real time, so that efficient scheduling processing can not be performed, wasted radio resources are allocated and the quality of service is degraded, in the conventional uplink high-speed packet communications method.

BRIEF SUMMARY OF THE INVENTION

In viewing of the foregoing, it is an object of the present invention to perform the efficient scheduling processing and to allocate radio resources efficiently in the uplink high-speed packet communications method.

A first aspect of the present invention is summarized as a packet communications method of performing packet communications between a mobile station and a base station.

In the packet communications method, the base station manages an amount of packets stored in a transmission buffer of the mobile station. The mobile station notifies a changed result of an amount of packets stored in the transmission buffer of the mobile station, when the amount of packets stored in the transmission buffer of the mobile station changes. The base station changes a managed amount in accordance with the changed result notified from the mobile station.

A second aspect of the present invention is summarized as a base station which performs packet communications with a mobile station. The base station includes a manager configured to manage an amount of packets stored in a transmission buffer of the mobile station. The manager is configured to change a managed amount in accordance with a changed result of an amount of packets stored in the transmission buffer of the mobile station. The changed result is notified from the mobile station.

A third aspect of the present invention is summarized as a mobile station which performs packet communications with a base station. The mobile station includes a transmission buffer configured to store packets to be transmitted to the base station and a notifier configured to notify a change result of an amount of packets stored in the transmission buffer to the base station when the amount of packets stored in the transmission buffer changes.

DETAILED DESCRIPTION OF THE INVENTION

<A Configuration of a First Embodiment of the Present Invention>

Figure 1:
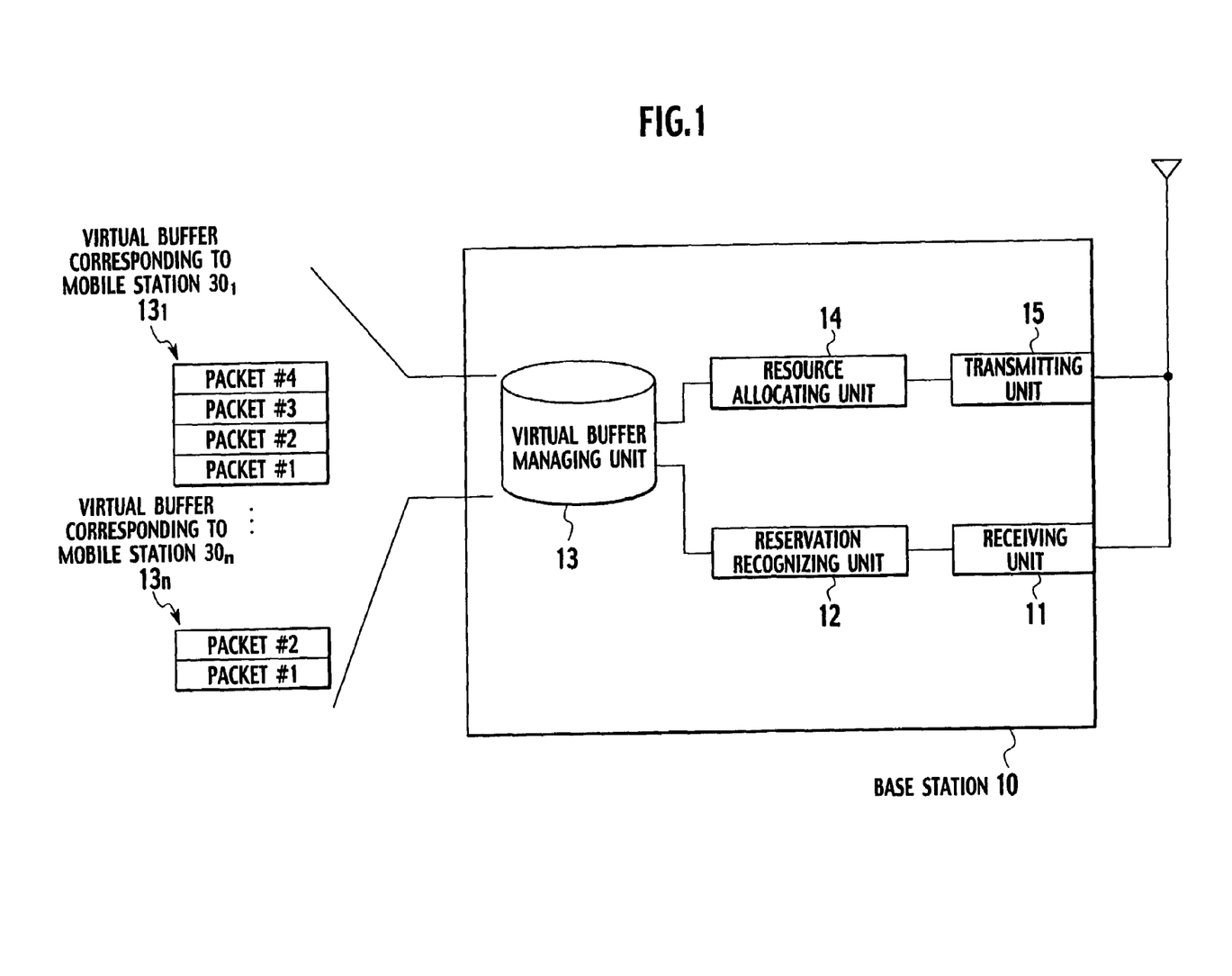
FIG. 1 is functional block diagram of a base station according to a first embodiment of the present invention.
Figure 2:
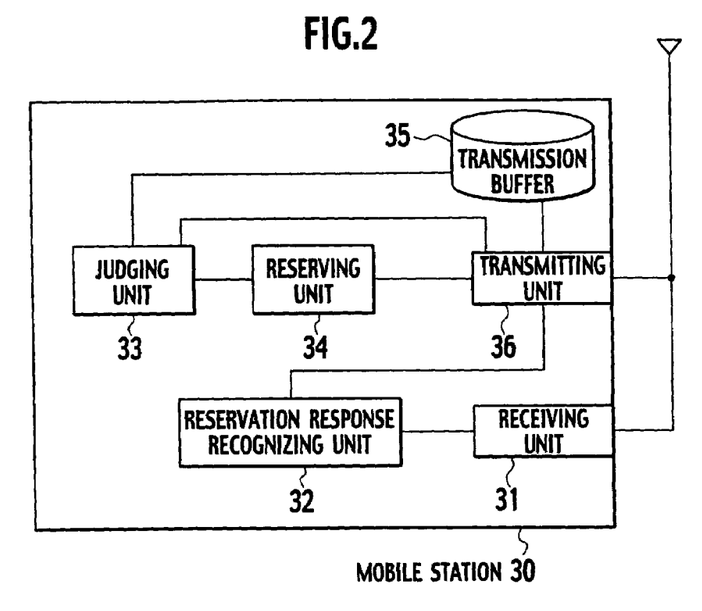
FIG. 2 is functional block diagram of a mobile station according to the first embodiment.

Referring to FIGS. 1 and 2, configurations of a base station and a mobile station which implement a packet communications method according to a first embodiment of the present invention will be described.

FIG. 1 shows functional blocks of the base station 10 according to the first embodiment, and FIG. 2 shows functional blocks of the mobile station 30 according to the first embodiment.

As shown in FIG. 1, the base station 10 includes a receiving unit 11, a reservation recognizing unit 12, a virtual buffer managing unit 13, a resource allocating unit 14 and a transmitting unit 15.

The receiving unit 11 is configured to receive uplink packets via a common packet channel (CPCH), and to receive "a change result of the number of packets (a change result of an amount of packets)", "communication quality information of packets" and the like via a uplink dedicated control channel (DCCH).

The change result of the number of packets includes a "plus reservation" and a "minus reservation". The plus reservation shows the number of packets which increase in a transmission buffer 35 of the mobile station 30 (an increment amount of packets stored in the transmission buffer 35 of the mobile station 30). The minus reservation shows the number of packets which decrease in a transmission buffer 35 of the mobile station 30 (a decrement amount of packets stored in the transmission buffer 35 of the mobile station 30).

For example, the plus reservation including information of "+2" shows that the number of packets stored in the transmission buffer 35 increases by two.

The minus reservation including information of "−2" shows that the number of packets stored in the transmission buffer 35 decreases by two.

The reservation recognizing unit 12 is configured to recognize the plus reservation or the minus reservation which are included the change result of the number of packets notified from the mobile station 30. The reservation recognizing unit 12 is configured to notify the recognized result to the virtual buffer managing unit 13.

The reservation recognizing unit 12 can be configured to notify an arrival time of the change result of the number of packets to the virtual buffer managing unit 13, when the change result of the number of packets includes the plus reservation.

The virtual buffer managing unit 13 is configured to manage the number of packets (an amount of packets) stored in the transmission buffer 35 of each mobile station $30_1$ to $30_n$.

The virtual buffer managing unit 13 is configured to change the number of packets stored in the transmission buffer 35 of each mobile station $30_1$ to $30_n$, in accordance with a change result (the plus reservation or the minus reservation) of the number of packets stored in the transmission buffer 35 of each mobile station $30_1$ to $30_n$. The change result is notified from each mobile station $30_1$ to $30_n$.

To be more specific, the virtual buffer managing unit 13 is configured to manage virtual buffer $13_1$ to $13_1$ corresponding to each mobile station $30_1$ to $30_n$.

The virtual buffer managing unit 13 is configured to store the same number of packets as packets stored in the transmission buffer 35 of each mobile station $30_1$ to $30_n$, in each virtual buffer $13_1$ to $13_n$.

The virtual buffer managing unit 13 is configured to change (increase or decrease) packets stored in each virtual buffer $13_1$ to $13_n$ corresponding to each mobile station $30_1$ to $30_n$, in accordance with the change result of the numbers of packets stored in the transmission buffer 35 of each mobile station $30_1$ to $30_n$.

In an example of FIG. 1, the virtual buffer managing unit 13 stores four packets (packets #1 to #4) in the virtual buffer $13_1$ corresponding to the mobile station $30_1$. And the virtual buffer managing unit 13 stores two packets (packets #1 and #2) in the virtual buffer $13_n$ corresponding to the mobile station $30_n$.

The virtual buffer managing unit 13 adds two packets to the virtual buffer $13_n$ corresponding to the mobile station $30_n$, when receiving a notification showing that the reservation recognizing unit 12 has recognized a plus reservation including information "+2".

On the other hand, the virtual buffer managing unit 13 deletes one packet from the virtual buffer $13_1$ corresponding to the mobile station $30_1$, when receiving a notification showing that the reservation recognizing unit 12 has recognized a minus reservation including information "−2".

The virtual buffer managing unit 13 can be configured to delete packets stored in the virtual buffer $13_1$, in predetermined order.

When adding a packet to the virtual buffer $13_1$ to $13_n$, the virtual buffer managing unit 13 can be configured to associate the added packet with an additional time of the packet.

Because the packet is added to the virtual buffer $13_1$ to $13_n$ in a short time after the change result of the number of packets arrives at the base station 10, the virtual buffer managing unit 13 can be configured to regard an arrival time of the change result as the additional time of the packet.

The virtual buffers $13_1$ to $13_n$ can have the same sizes, and the virtual buffers $13_1$ to $13_n$ can have different sizes in accordance with the number of packets stored in the transmission buffer 35.

The resource allocating unit 14 is configured to allocate a radio resource which is used in uplink packet communications with the mobile station, by referring to the virtual buffer corresponding to the mobile station 30.

For example, the resource allocating unit 14 can allocate the radio resources (for example, radio channels, codes and transmission timings) to packets stored in the virtual buffer managed by the virtual buffer managing unit 13, in ascending order of a packet number starting from a packet #1.

The transmitting unit 15 is configured to notify the radio resources allocated by the resource allocating unit 14 to the mobile station via a downlink dedicated control channel (DCCH).

As shown in FIG. 2, the mobile station 30 includes a receiving unit 31, a reservation response recognizing unit 32, a judging unit 33, a reserving unit 34, a transmission buffer 35 and a transmitting unit 36.

The receiving unit 31 is configured to receive a notification of the radio resources allocated by the resource allocation unit 14 from the base station 10 via the downlink DCCH.

The reservation response recognizing unit 32 is configured to instruct the transmitting unit 36 to transmit uplink packets using the radio resources (for example, a radio channel, a code and a transmitting timing) notified by the resource allocation unit 14.

The judging unit 33 is configured to judge whether a predetermined situation occurs or not.

For example, the judging unit 33 can judge whether a packet has been generated to be transmitted to the base station 10 or not. The judging unit 33 can judge whether a packet has been discarded in the transmission buffer 35 or not.

The judging unit 33 can judge whether a packet has been transmitted to the base station successfully or not. To be more specific, the judging unit 33 can judge whether or not to receive an ACK signal related to the transmitted packet.

The judging unit 33 can judge whether a packet has been generated to be re-transmitted to the base station 10 or not. In other words, the judging unit 33 can judge whether transmission of the packet to the base station 10 fails or not. To be more specific, the judging unit 33 can judge whether or not to receive a NACK signal related to the transmitted packet.

The reserving unit 34 is configured to generate the change result including the plus reservation or the minus reservation, in accordance with a judgment result from the judging unit 33.

When packets to be transmitted to the base station 10 are generated, the reserving unit 34 is configured to generate a plus reservation including the number of generated packets, as an increment number (amount) of packets stored in the transmission buffer.

When packets stored in the transmission buffer 35 are discarded, the reserving unit 34 is configured to generate a minus reservation including the number of discarded packets, as a decrement number (amount) of packets stored in the transmission buffer.

The transmission buffer 35 is configured to store packets to be transmitted to the base station 10. The transmission buffer 35 can be configured to store the generated packets, by using a method of inserting the generated packets into the queue in accordance with a predetermined scheduling scheme.

The transmission buffer 35 can be configured to discard packets which have elapsed for a predetermined period since the packets were stored in the virtual buffer, packets which have been re-transmitted a predetermined number of times, packets which a user has cancelled to transmit and the like.

The transmitting unit 36 is configured to transmit packets stored in the transmission buffer 35 to the base station 10 via the uplink CPCH. The transmitting unit 36 is configured to transmit the packets by using the radio resource instructed by the reservation response recognizing unit 32.

The transmitting unit 36 is configured to transmit the change result including the plus reservation or the minus reservation generated by the reserving unit 34 to the base station 10 via the uplink DCCH.

The transmitting unit 36 is configured to transmit the number of packets stored in the transmission buffer 35 at a predetermined interval, so as to synchronize between the transmission buffer 35 and the virtual buffer in the virtual buffer managing unit 13 of the base station 10.

In the embodiment, the judging unit 33, the reserving unit 34 and the transmitting unit 36 constitute a notifier configured to notify a change result of an amount (number) of packets stored in the transmission buffer 35 to the base station 10, each time the amount (number) of packets stored in the transmission buffer changes.

<An Operation of the First Embodiment>

First, referring to FIG. 3, an operation of the mobile station 30 according to the first embodiment will be described.

Figure 3:
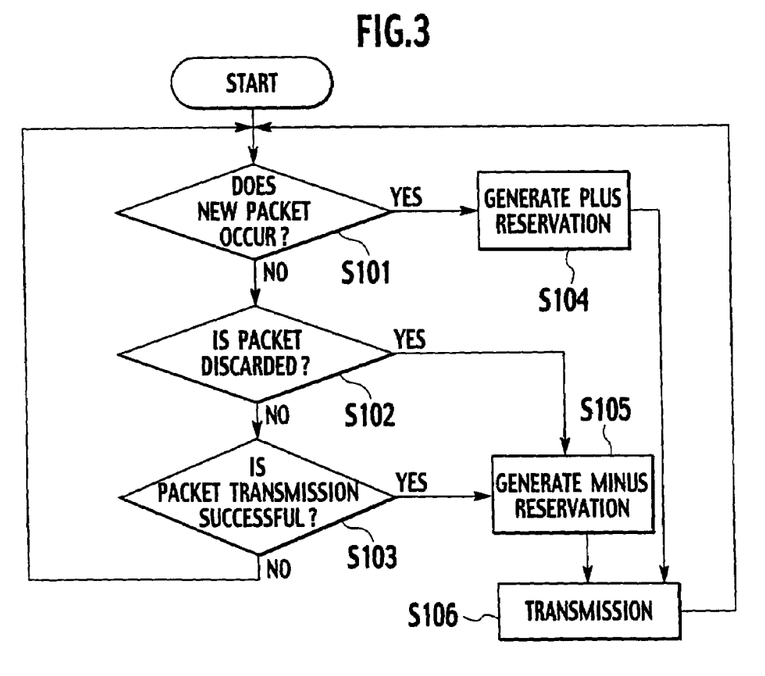
FIG. 3 is a flowchart showing an operation of the mobile station according to the first embodiment.

As shown in FIG. 3, in step S101, the judging unit 33 of the mobile station 30 judges whether packets to be transmitted to the base station 10 are generated or not, by monitoring an input operation of a user and the like. When the answer is YES, the operation moves to step S104. On the other hand, when the answer is NO, the operation moves to step S102.

In step S102, the judging unit 33 judges whether packets which have elapsed for a predetermined period since the packets were stored in the virtual buffer, packets which have been re-transmitted a predetermined number of times, packets which a user has cancelled to transmit and the like are discarded or not, by monitoring the transmission buffer 35. When the answer is YES, the operation moves to step S105. On the other hand, when the answer is NO, the operation moves to step S103.

In step S103, the judging unit 33 judges whether packets are transmitted to the base station 10 successfully or not, by monitoring the transmitting unit 36.

To be more specific, the judging unit 33 judges that packets are transmitted to the base station 10 successfully, when the transmitting unit 26 receives an ACK signal from the base station 10. When the answer is YES, the operation moves to step S105. On the other hand, when the answer is NO, the operation returns to step S101.

In step S104, the reserving unit 34 of the mobile station 30 generates a plus reservation including the number of packets generated to be transmitted to the base station 10, as an increment number of packets stored in the transmission buffer 35.

In step S105, the reserving unit 34 of the mobile station 30 generates a minus reservation including the number of discarded packets or the number of packets which have been transmitted to the base station 10 successfully, as a decrement number of packets stored in the transmission buffer 35.

In step S106, the transmitting unit 36 of the mobile station 30 transmits the plus reservation or the minus reservation generated by the reserving unit 34 to the base station 10 via the uplink DCCH.

The mobile station 30 is configured to perform steps S101 to S106 repeatedly. The mobile station 30 can be configured to perform steps S101 to S103 in parallel.

Figure 4:
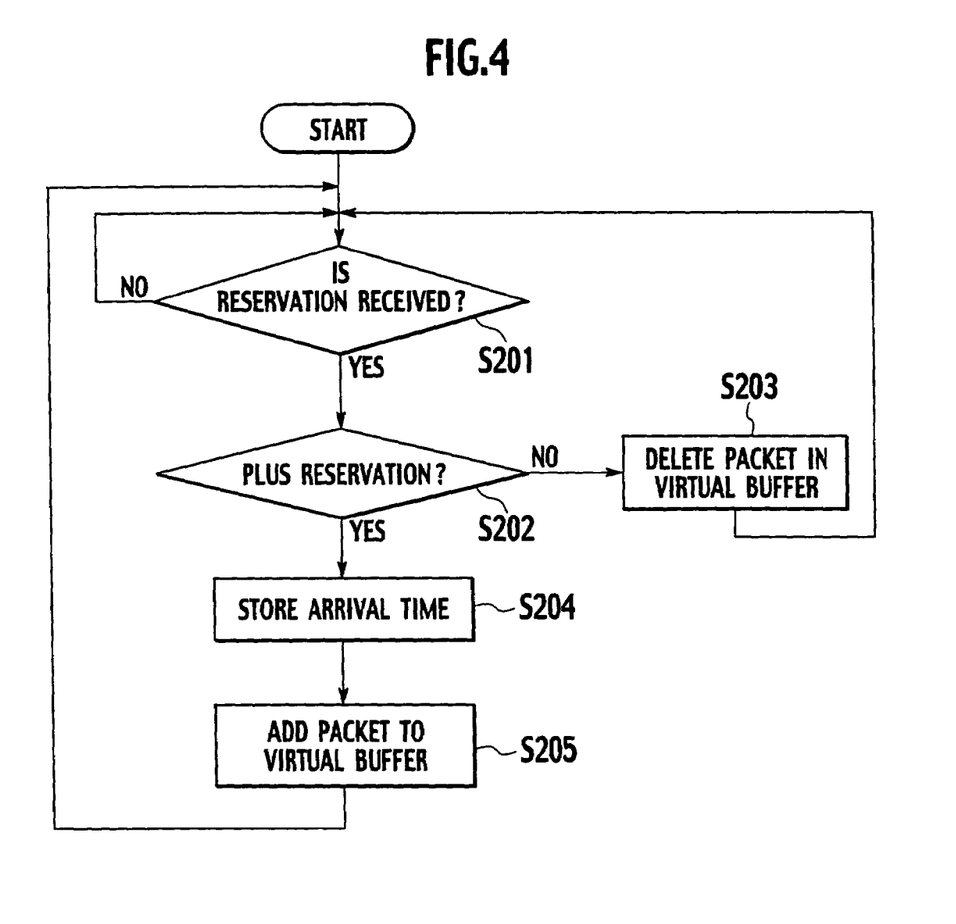
FIG. 4 is a flowchart showing an operation of the base station according to the first embodiment.

Second, referring to FIG. 4, an operation of the base station 10 according to the first embodiment will be described.

In step S201, the receiving unit 11 of the base station 10 determines whether or not to receive the change result of the number of packets from the mobile station 30, by monitoring the uplink DCCH.

When the receiving unit 11 determines to receive the change result, in step S201, the reservation recognizing unit 12 of the base station 10 recognizes a plus reservation or a minus reservation which are included the change result received by the receiving unit 11.

When a minus reservation is determined to be included in the change result, in step S203, the virtual buffer managing unit 13 of the base station 10 deletes packets corresponding to a decrement number of packets included in the minus reservation, from the virtual buffer corresponding to the mobile station which has transmitted the minus reservation.

On the other hand, when a plus reservation is determined to be included in the change result, the virtual buffer managing unit 13 stores a reception time (an arrival time) of the plus reservation in step S204, and add packets corresponding to an increment number of packets included in the plus reservation in the transmission buffer 35, so as to associate the added packet with the reception time, in step S205.

Figure 5:
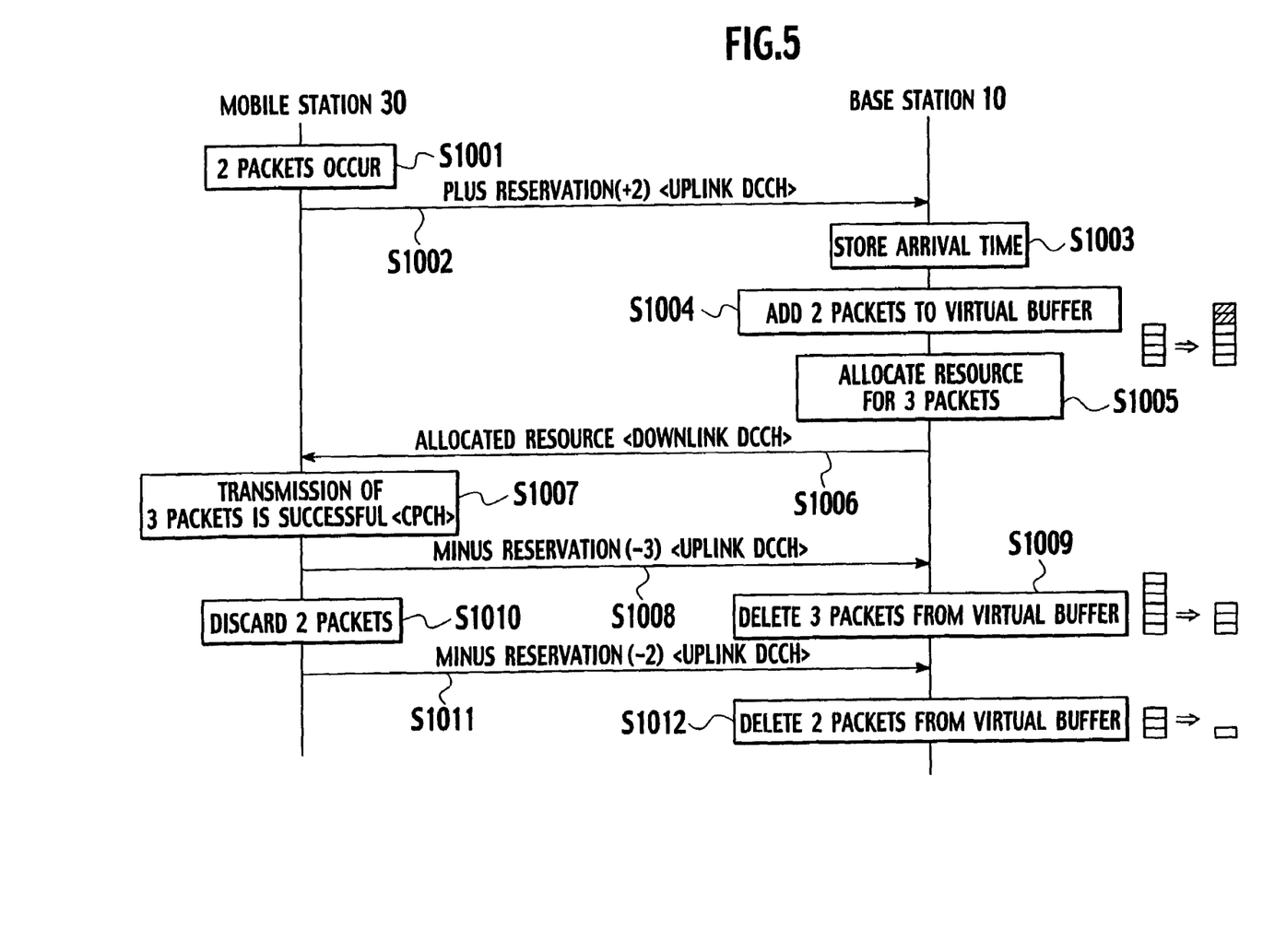
FIG. 5 is a sequence diagram showing a packet communications method according to the first embodiment.

Third, referring to FIG. 5, an example of the packet communications method according to the first embodiment will be described.

In step S1001, the judging unit 33 detects that two packets to be transmitted to the base station 10 are generated, and the reserving unit 34 generates a plus reservation (+2) including information showing that the number of packets stored in the transmission buffer 35 increases by two.

In step S1002, the transmitting unit 36 transmits the plus reservation (+2) to the base station 10 via the uplink DCCH.

In step S1003, the reservation recognizing unit 12 notifies the plus reservation and the arrival time of the plus reservation to the virtual buffer managing unit 13.

In step S1004, the virtual buffer managing unit 13 adds two packets to the virtual buffer corresponding to the mobile station 30, in accordance with the notification from the reservation recognizing unit 12.

The virtual buffer managing unit 13 can associate the added packets with the arrival time of the plus reservation as the addition time of the packets.

In step S1005, the resource allocating unit 14 allocates radio resources (for example, a radio channel, a code and a transmission timing), by referring to the virtual buffer corresponding to the mobile station 30. In an example of FIG. 5, the resource allocating unit 14 allocates radio resources for three packets.

In step S1006, the transmitting unit 15 notifies the radio resources allocated by the resource allocating unit 14 to the mobile station 30 via the downlink DCCH.

In step S1007, the transmitting unit 36 transmits three packets to the base station 10 via the uplink CPCH, by using the radio resources instructed by the reservation response recognizing unit 32.

Then, the judging unit 33 detects that three packets have been transmitted to the base station 10 successfully and the number of packets stored in the transmission buffer 35 decreases by three. The reserving unit 34 generates a minus reservation (−3) including information showing that the number of packets stored in the transmission buffer 35 decreases by three.

In step S1008, the transmitting unit 36 transmits the minus reservation (−3) to the base station 10 via the uplink DCCH.

In step S1009, the reservation recognizing unit 12 notifies reception of the minus reservation (−3) to the virtual buffer managing unit 13.

Then, the virtual buffer managing unit 13 deletes three packets from the virtual buffer corresponding to the mobile station 30, in accordance with the notification from the reservation recognizing unit 12.

In step S1010, the transmission buffer 35 discards two packets which have elapsed for a predetermined period since the packets were stored in the virtual buffer.

Then, the judging unit 33 detects that the number of packets stored in the transmission buffer 35 decreases by two. The reserving unit 34 generates a minus reservation (−2) including information showing that the number of packets stored in the transmission buffer 35 decreases by two.

In step S1011, the transmitting unit 36 transmits the minus reservation (−2) to the base station 10 via the uplink DCCH.

In step S1012, the reservation recognizing unit 12 notifies reception of the minus reservation (−2) to the virtual buffer managing unit 13.

Then, the virtual buffer managing unit 13 deletes two packets from the virtual buffer corresponding to the mobile station 30, in accordance with the notification from the reservation recognizing unit 12.

<Functions and Effects of the First Embodiment>

According to the packet communications method of the first embodiment, the mobile station 30 is configured to notify the change result of the number of packets (the plus reservation or the minus reservation) to the base station 10, each time the number of the packets stored in the transmission buffer 35 changes, so that the base station 10 can grasp a dynamic change in the transmission buffer 35 of the mobile station 30 in real time.

According to the packet communications method of the first embodiment, the mobile station 30 is configured to notify the change result of the number of packets having a small amount of data to the base station 10, so as to prevent an amount of traffic between the mobile station 30 and the base station 10 from increasing.

According to the packet communications method of the first embodiment, the base station 10 only increases or decreases the number of packets stored in the virtual buffer corresponding to the mobile station 30 in accordance with the change result of the number of packets, so as to prevent system efficiency due to a control load from being reduced.

According to the packet communications method of the first embodiment, the virtual buffer managing unit 13 increases or decreases the number of packets stored in the virtual buffer corresponding to the mobile station 30 in accordance with the change result of the number of packets notified from the mobile station 30, so as to follow a change in the transmission buffer 35 of the mobile station 30 in real time with a light control load.

According to the packet communications method of the first embodiment, the resource allocating unit 14 allocate radio resources which are used in the uplink packet communications with the mobile station 30 by referring to the virtual buffer corresponding to the mobile station 30, so that the base station 10 can grasp a dynamic change in the transmission buffer 35 of the mobile station 30 in real time and perform efficient scheduling processing.

<A Second Embodiment of the Present Invention>

Figure 6:
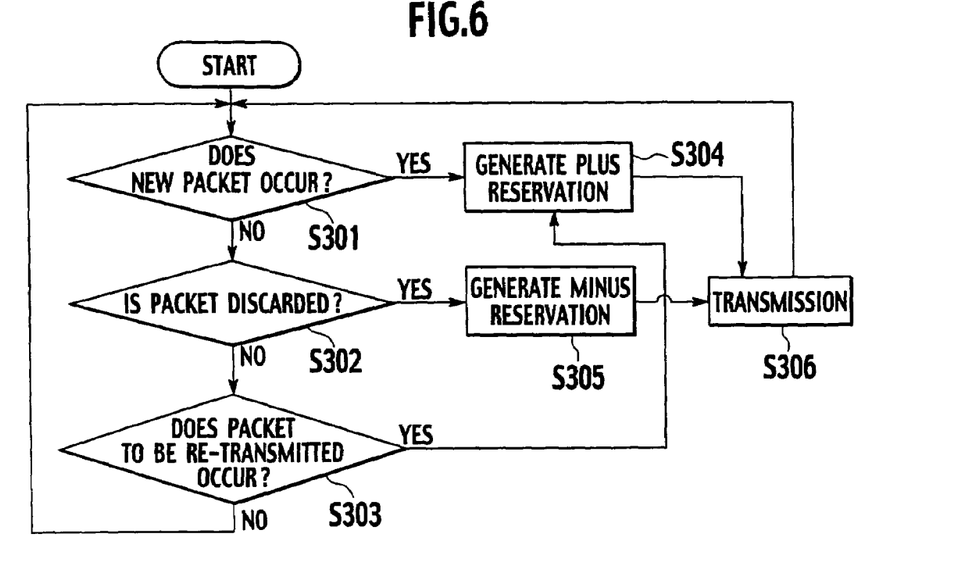
FIG. 6 is a flowchart showing an operation of the mobile station according to a second embodiment of the present invention.
Figure 7:
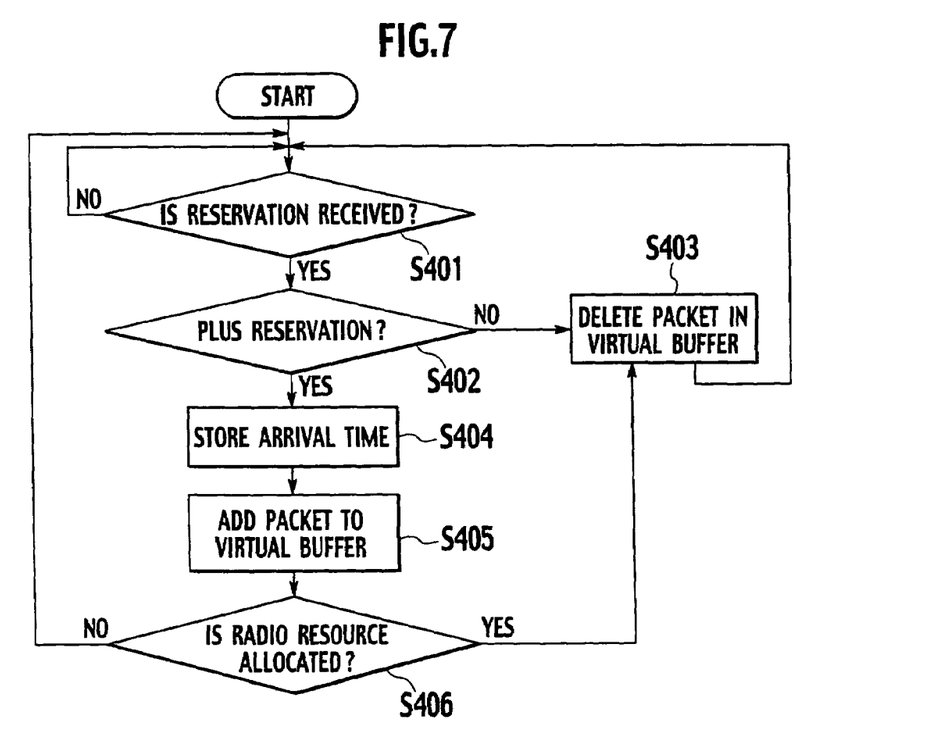
FIG. 7 is a flowchart showing an operation of the base station according to the second embodiment.
Figure 8:
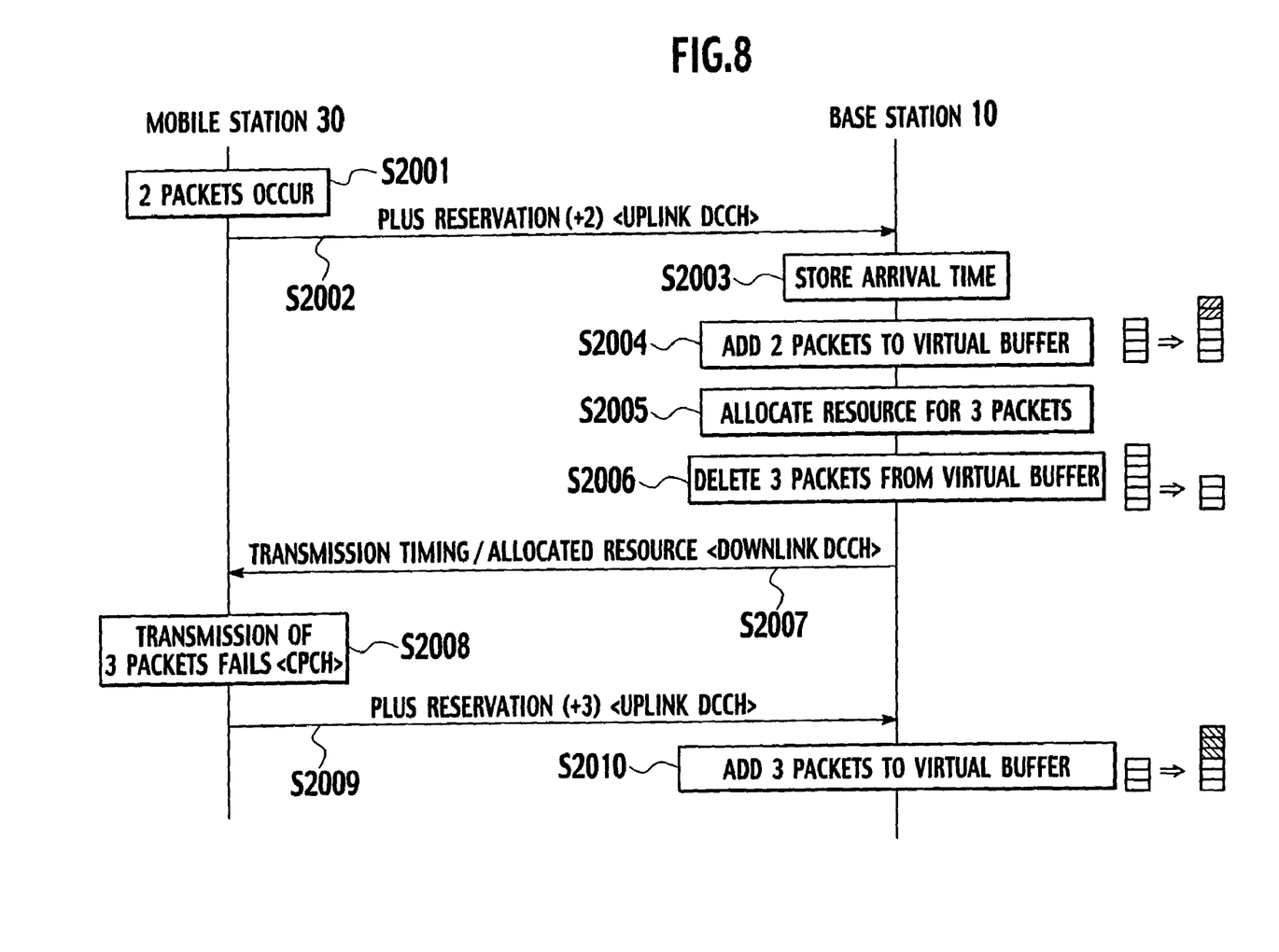
FIG. 8 is a sequence diagram showing a packet communications method according to the second embodiment.

Referring to FIGS. 6 to 8, a second embodiment of the present invention will be described. Hereinafter, mainly, differences between the first embodiment and the second embodiment will be described.

The virtual buffer managing unit 13 of the base station 10 according to the second embodiment is configured to change the number of packets stored in the virtual buffer corresponding to the mobile station 30, in accordance with allocations of radio resources by the resource allocating unit 14.

For example, when having allocated radio resources to packets stored in the virtual buffer corresponding to a specific mobile station 30, the virtual buffer managing unit 13 configured to delete the packets to which the radio resources have been allocated, from the virtual buffer corresponding to the specific mobile station 30.

When packets to be re-transmitted to the base station 10 occur (that is, when transmission of packets to the base station 10 fails), the reserving unit 34 of the mobile station 30 is configured to generate a plus reservation including the number of the packets to be re-transmitted, as an increment number of packets stored in the transmission buffer 35.

First, referring to FIG. 6, an operation of the mobile station 30 according to the second embodiment will be described.

As shown in FIG. 6, in step S301, the judging unit 33 of the mobile station 30 judges whether packets to be transmitted to the base station 10 are generated or not, by monitoring an input operation of a user and the like. When the answer is YES, the operation moves to step S304. On the other hand, when the answer is NO, the operation moves to step S302.

In step S302, the judging unit 33 judges whether packets which have elapsed for a predetermined period since the packets were stored in the virtual buffer, packets which have been re-transmitted a predetermined number of times, packets which a user has cancelled to transmit and the like are discarded or not, by monitoring the transmission buffer 35. When the answer is YES, the operation moves to step S305. On the other hand, when the answer is NO, the operation moves to step S303.

In step S303, the judging unit 33 judges whether packets to be re-transmitted to the base station 10 have occurred or not, by monitoring the transmitting unit 36.

To be more specific, when having received a NACK signal from the base station 10, the judging unit 33 judges that packets to be re-transmitted to the base station 10 have occurred. When the answer is YES, the operation moves to step S304. On the other hand, when the answer is NO, the operation returns to step S301.

In step S304, the reserving unit 34 of the mobile station 30 generates a plus reservation including the number of packets generated to be transmitted or re-transmitted to the base station 10, as an increment number of packets stored in the transmission buffer 35.

In step S305, the reserving unit 34 of the mobile station 30 generates a minus reservation including the number of discarded packets, as a decrement number of packets stored in the transmission buffer 35.

In step S306, the transmitting unit 36 of the mobile station 30 transmits the plus reservation or the minus reservation generated by the reserving unit 34 to the base station 10 via the uplink DCCH.

The mobile station 30 is configured to perform steps S301 to S306 repeatedly. The mobile station 30 can be configured to perform steps S301 to S303 in parallel.

Second, referring to FIG. 7, an operation of the base station 10 according to the second embodiment will be described. Operations of steps S401 to S405 are the same as the operations of steps S101 to S105 shown in FIG. 4.

In step S406, the virtual buffer managing unit 13 of the base station 10 determines whether the resource allocating unit 14 has allocated radio resources to packets stored in the virtual buffer corresponding to the mobile station 30 or not.

When the radio resources is determined to have been allocated, the virtual buffer managing unit 13 deletes packets corresponding to the numbers of packets to which the radio resources have been allocated, from the virtual buffer corresponding to the mobile station 30.

On the other hand, when the radio resources is determined not to have been allocated, the operation returns to step S401.

Third, referring to FIG. 8, an example of the packet communications method according to the second embodiment will be described. Operations of steps S2001 to S2005 are the same as the operations of steps S1001 to S1005 shown in FIG. 5.

In step S2006, the virtual buffer managing unit 13 deletes packets corresponding to the numbers of packets to which the resource allocating unit 14 has allocated the radio resources, from the virtual buffer corresponding to the mobile station 30. In an example of FIG. 8, the virtual buffer managing unit 13 deletes three packets from the virtual buffer.

In step S2007, the transmitting unit 15 notifies the radio resources (including a transmission timing) allocated by the resource allocating unit 14 to the mobile station 30 via the downlink DCCH.

In step S2008, although the transmitting unit 36 tries to transmit three packets to the base station 10 via the uplink CPCH, by using the radio resources instructed by the reservation response recognizing unit 32, the transmission of the three packets fails.

To be more specific, the transmitting unit 36 receives an NACK signal corresponding to the transmitted three packets, from the base station 10.

Then, the judging unit 33 detects that transmission of the three packets has failed, the three packets to be re-transmitted have occurred and the number of packets stored in the transmission buffer 35 increases by three. The reserving unit 34 generates a plus reservation (+3) including information showing that the number of packets stored in the transmission buffer 35 increases by three.

In step S2009, the transmitting unit 36 transmits the plus reservation (+3) to the base station 10 via the uplink DCCH.

In step S2010, the reservation recognizing unit 12 notifies the received plus reservation (+3) and an arrival time of the plus reservation (+3), to the virtual buffer managing unit 13.

Then, the virtual buffer managing unit 13 adds three packets to the virtual buffer corresponding to the mobile station 30, in accordance with the notification from the reservation recognizing unit 12.

The virtual buffer managing unit 13 can be configured to associate the added packets with the arrival time of the plus reservation as a reception time of the packets.

<A Third Embodiment of the Present Invention>

Referring to FIGS. 9 to 12, a third embodiment of the present invention will be described. Hereinafter, mainly, differences between the first embodiment and the third embodiment will be described.

Figure 9:
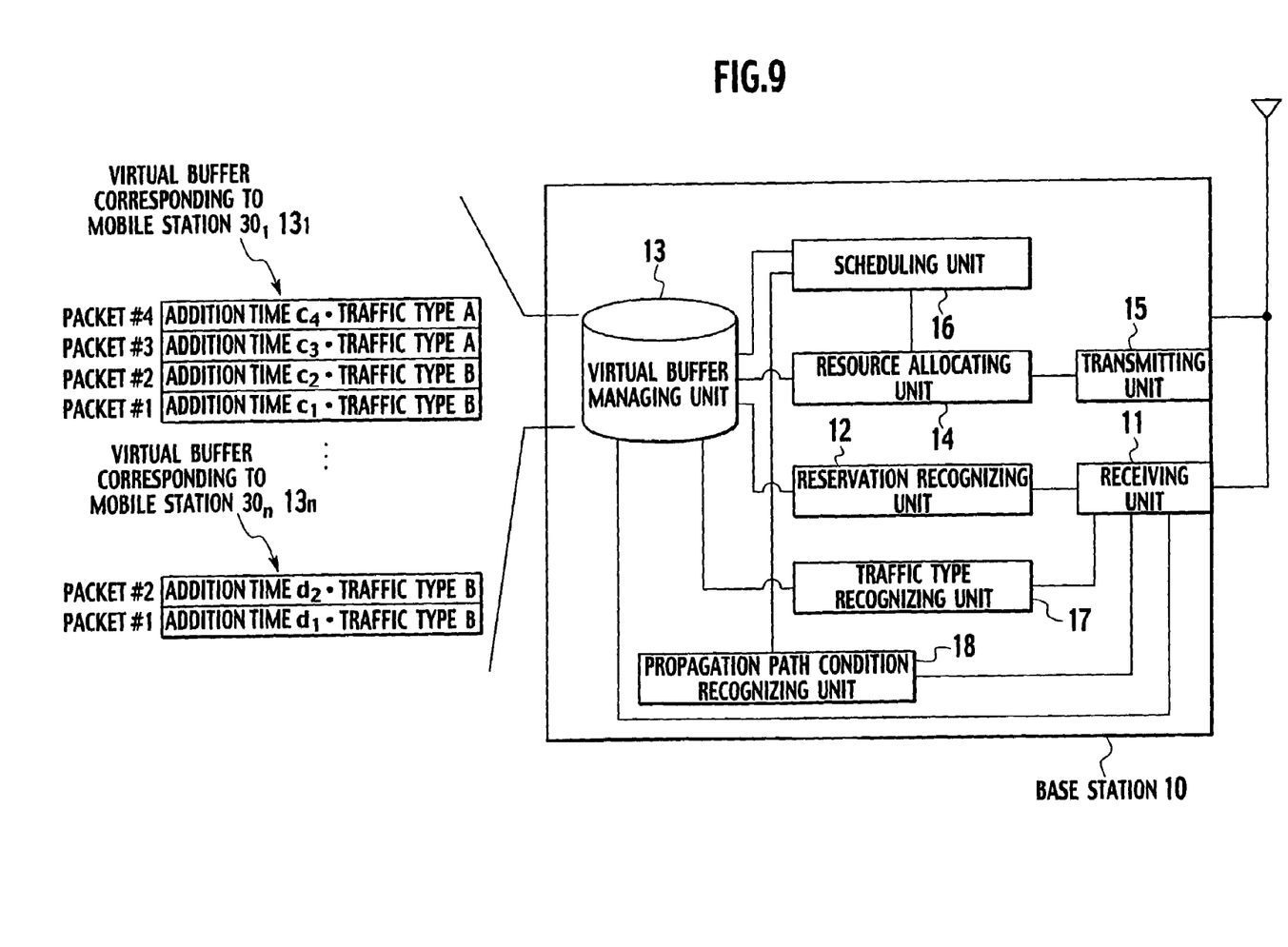
FIG. 9 is functional block diagram of a base station according to a third embodiment of the present invention.

The base station 10 further includes a scheduling unit 16, a traffic type recognizing unit 17 and a propagation path condition recognizing unit 18, in addition to the configurations of the base station 10 according to the first embodiment.

The virtual buffer managing unit 13 is configured to store packets which associates their additional times with communication quality information in the virtual buffer corresponding to the mobile station 30.

In other words, when a new packet is added to the virtual buffer, the virtual buffer managing unit 13 is configured to store the new packet in association with the additional time of the new packet and the communication quality information related to the new packet.

The communication quality information shows a traffic type such as a real-time traffic "A" or a non real-time traffic "B", QoS information such as the maximum acceptable queue time of each traffic type and the like.

When having received packets from the mobile station 30, the virtual buffer managing unit 13 is configured to increase or decrease the number of packets stored in the transmission buffer 35 corresponding to the mobile station 30, in accordance with the number of packets which have been received successfully.

In other words, the virtual buffer managing unit 13 is configured to delete packets corresponding to the number of packets which the mobile station 30 has transmitted via the uplink CPCH and the receiving unit 11 has received, from the virtual buffer corresponding to the mobile station 30.

The virtual buffer managing unit 13 is configured to delete packets which have elapsed for a predetermined period since the packets were added to the virtual buffer, from the virtual buffer.

To be more specific, the virtual buffer managing unit 13 is configured to delete packets which have been queued in the virtual buffer for more than the maximum acceptable queue time, by referring the maximum acceptable queue time of each traffic type.

The scheduling unit 16 is configured to perform scheduling processing of allocations of radio resources which are used in uplink packet communications with the mobile station 30, in accordance with the additional times of the packets and the communication quality information related to the packets, referring to the virtual buffer managed by the virtual buffer managing unit 13.

The scheduling unit 16 can be configured to perform scheduling processing of allocations of radio resources which are used in uplink packet communications with the mobile station 30, in accordance with propagation path conditions recognized by the propagation path condition recognizing unit 18.

For example, the scheduling unit 16 can arrange packets in the virtual buffer, so as to preferentially allocate radio resources to a packet having a high priority (for example, a real-time packet), in accordance with the communication quality information (a traffic type) associated with each packet stored in the virtual buffer.

When a propagation path condition between the base station 10 and the mobile station 30 is bad, the scheduling unit 16 can be configured to delete a specific packet from the virtual buffer.

The traffic type recognizing unit 17 is configured to recognize communication quality information of each packet which is transmitted from the mobile station 30 together with the change result of the number of packets, so as to notify the recognizing result to the virtual buffer managing unit 13.

The propagation path condition recognizing unit 18 is configured to recognize a propagation path condition between the base station 10 and the mobile station 30, by using a reception condition of pilot signals transmitted from the mobile station 30 and the like, so as to notify the recognized propagation path condition to the scheduling unit 16.

The judging unit 33 is configured to judge only whether packets to be transmitted to the base station 10 are generated or not.

In other words, the judging unit 33 is configured not to judge whether or not packets to be re-transmitted to the base station 10, and whether or not packets stored in the transmission buffer 35 are discarded.

Only when packets to be transmitted to the base station 10 are generated, the reserving unit 34 is configured to generate a plus reservation including the number of generated packets as an increment number of packets stored in the transmission buffer 35.

In other words, even when packets to be re-transmitted to the base station 10 occur, the reserving unit 34 is configured not to generate a plus reservation including the number of the packets to be re-transmitted as an increment number of packets stored in the transmission buffer 35.

Also, even when packets are discarded in the transmission buffer 35, the reserving unit 34 is configured not to generate a minus reservation including the number of the discarded packets as an decrement number of packets stored in the transmission buffer 35.

First, referring to FIG. 10, an operation of the mobile station 30 according to the third embodiment will be described.

Figure 10:
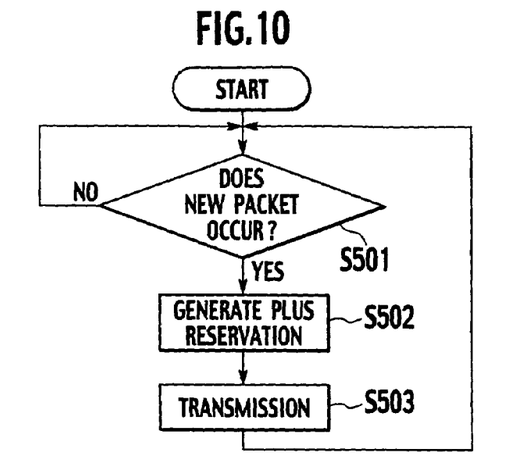
FIG. 10 is a flowchart showing an operation of the mobile station according to the third embodiment.

As shown in FIG. 10, in step S501, the judging unit 33 of the mobile station 30 judges whether packets to be transmitted to the base station 10 are generated or not, by monitoring an input operation of a user and the like. When the answer is YES, the operation moves to step S502. On the other hand, when the answer is NO, the operation repeats step S302.

In step S502, the reserving unit 34 of the mobile station 30 generates a plus reservation including the number of packets generated to be transmitted to the base station 10, as an increment number of packets stored in the transmission buffer 35.

In step S503, the transmitting unit 36 of the mobile station 30 transmits the plus reservation generated by the reserving unit 34 to the base station 10 via the uplink DCCH.

Figure 11:
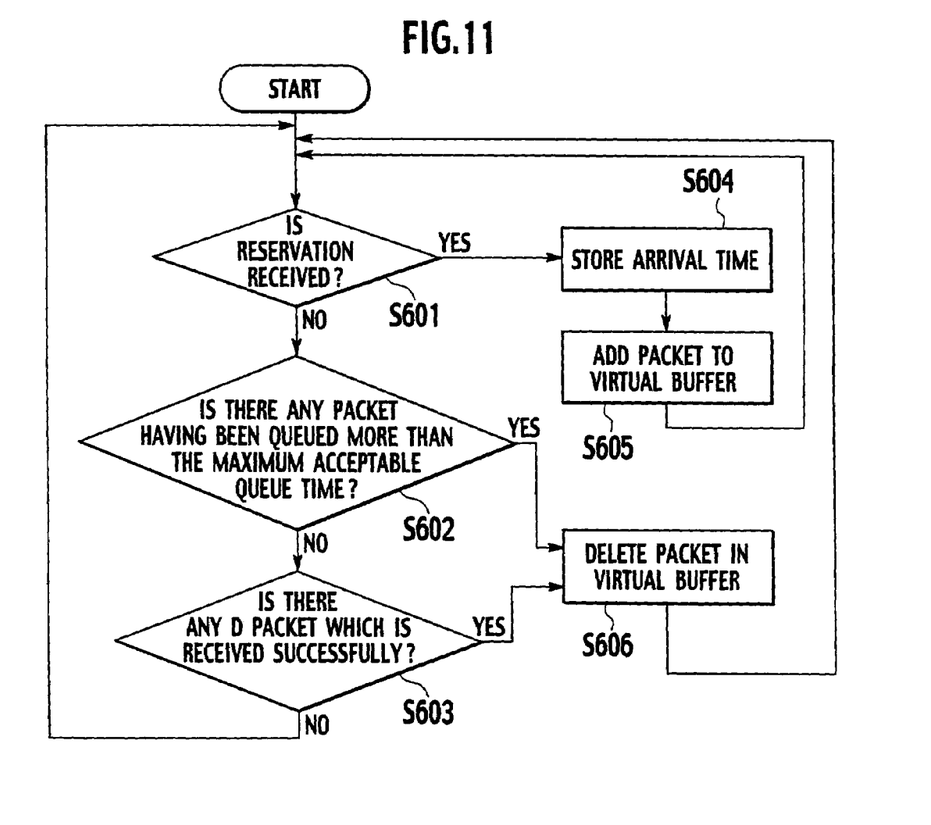
FIG. 11 is a flowchart showing an operation of the base station according to the third embodiment.

Second, referring to FIG. 11, an operation of the base station 10 according to the third embodiment will be described.

In step S601, the receiving unit 11 of the base station 10 determines whether or not to receive the change result of the number of packets (the plus reservation) from the mobile station 30, by monitoring the uplink DCCH. When the answer is YES, the operation moves to step S604. On the other hand, when the answer is NO, the operation moves to step S602.

In step S602, the virtual buffer managing unit 13 determines whether or not there is a packet which has been queued in the virtual buffer for more than the maximum acceptable queue time. When the answer is YES, the operation moves to step S606. On the other hand, when the answer is NO, the operation moves to step S603.

In step S603, the virtual buffer managing unit 13 determines whether or not to receive a packet transmitted from the mobile station 30 successfully, by monitoring the receiving unit 11. When the answer is YES, the operation moves to step S606. On the other hand, when the answer is NO, the operation returns to step S601.

In step S604, the virtual buffer managing unit 13 stores a reception time (an arrival time) of the change result of the number of packets (the plus reservation).

In step S605, the virtual buffer managing unit 13 adds packets corresponding to the increment number of packets included in the change result of the number of packets (the plus reservation), in association with the arrival times of the packets, to the virtual buffer corresponding to the mobile station 30.

In step S606, the virtual buffer managing unit 13 deletes packets corresponding to the number of packets which have been queued in the virtual buffer for more than the maximum acceptable queue time or have been received successfully, from the virtual buffer.

The base station 10 is configured to perform steps S601 to S606 repeatedly. The base station 10 can be configured to perform steps S601 to S603 in parallel.

Figure 12:
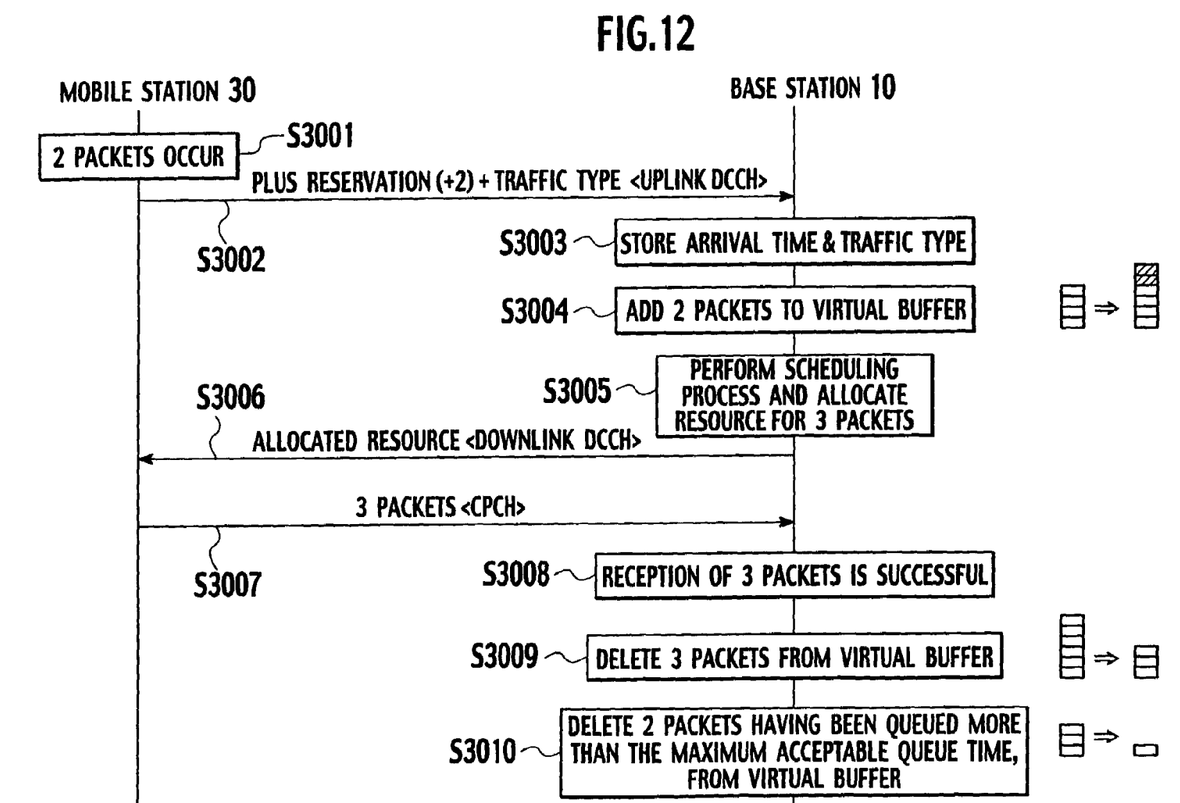
FIG. 12 is a sequence diagram showing a packet communications method according to the third embodiment.

Third, referring to FIG. 12, an example of the packet communications method according to the third embodiment will be described.

In step S3001, the judging unit 33 detects that two packets to be transmitted to the base station 10 are generated, and the reserving unit 34 generates a plus reservation (+2) including information showing that the number of packets stored in the transmission buffer 35 increases by two. In step S3001, the judging unit 33 also detects the communication quality information (the traffic types) of the generated packets.

In step S3002, the transmitting unit 36 transmits the plus reservation (+2) and the traffic types to the base station 10 via the uplink DCCH.

The traffic types can be transmitted over the different packets from packets for transmitting the plus reservation (+2). The traffic types can be transmitted by being written in header parts of the packets for transmitting the plus reservation (+2).

In step S3003, the reservation recognizing unit 12 notifies the plus reservation and the arrival time of the plus reservation to the virtual buffer managing unit 13.

The traffic type recognizing unit 17 notifies the traffic types transmitted from the mobiles station 30 together with the plus reservation (+2) to the virtual buffer managing unit 13.

In step S3004, the virtual buffer managing unit 13 adds two packets to the virtual buffer corresponding to the mobile station 30, in accordance with the notification from the reservation recognizing unit 12 and the traffic type recognizing unit 17.

The virtual buffer managing unit 13 is configured to store the added two packets in association with the arrival time of the plus reservation and the traffic types.

In step S3005, the scheduling unit 16 performs scheduling processing of allocations of radio resources which are used in the uplink packet communications with the mobile station 30, in accordance with the traffic types, a propagation path condition between the base station 10 and the mobile station 30 and the like.

Then, the resource allocating unit 14 allocates the radio resources (for example, a radio channel, a code and a transmission timing), by referring to the virtual buffer corresponding to the mobile station 30. In an example of FIG. 12, the resource allocating unit 14 allocates radio resources for three packets.

In step S3006, the transmitting unit 15 notifies the radio resources allocated by the resource allocating unit 14 to the mobile station 30 via the downlink DCCH.

In step S3007, the transmitting unit 36 transmits three packets to the base station 10 via the uplink CPCH, by using the radio resources instructed by the reservation response recognizing unit 32.

In step S3008, the receiving unit 11 of the base station 10 has received the three packets successfully.

In step S3009, the receiving unit 11 notifies successful reception of the three packets to the virtual buffer managing unit 13.

Then, the virtual buffer managing unit 13 deletes three packets from the virtual buffer corresponding to the mobile station 30, in accordance with the notification from the receiving unit 11.

In step S3010, the virtual buffer managing unit 13 discards two packets which have been queued in the virtual buffer for more than the maximum acceptable queue time, from the virtual buffer, by referring to the maximum acceptable queue time of each traffic type.

<A Fourth Embodiment of the Present Invention>

Figure 13:
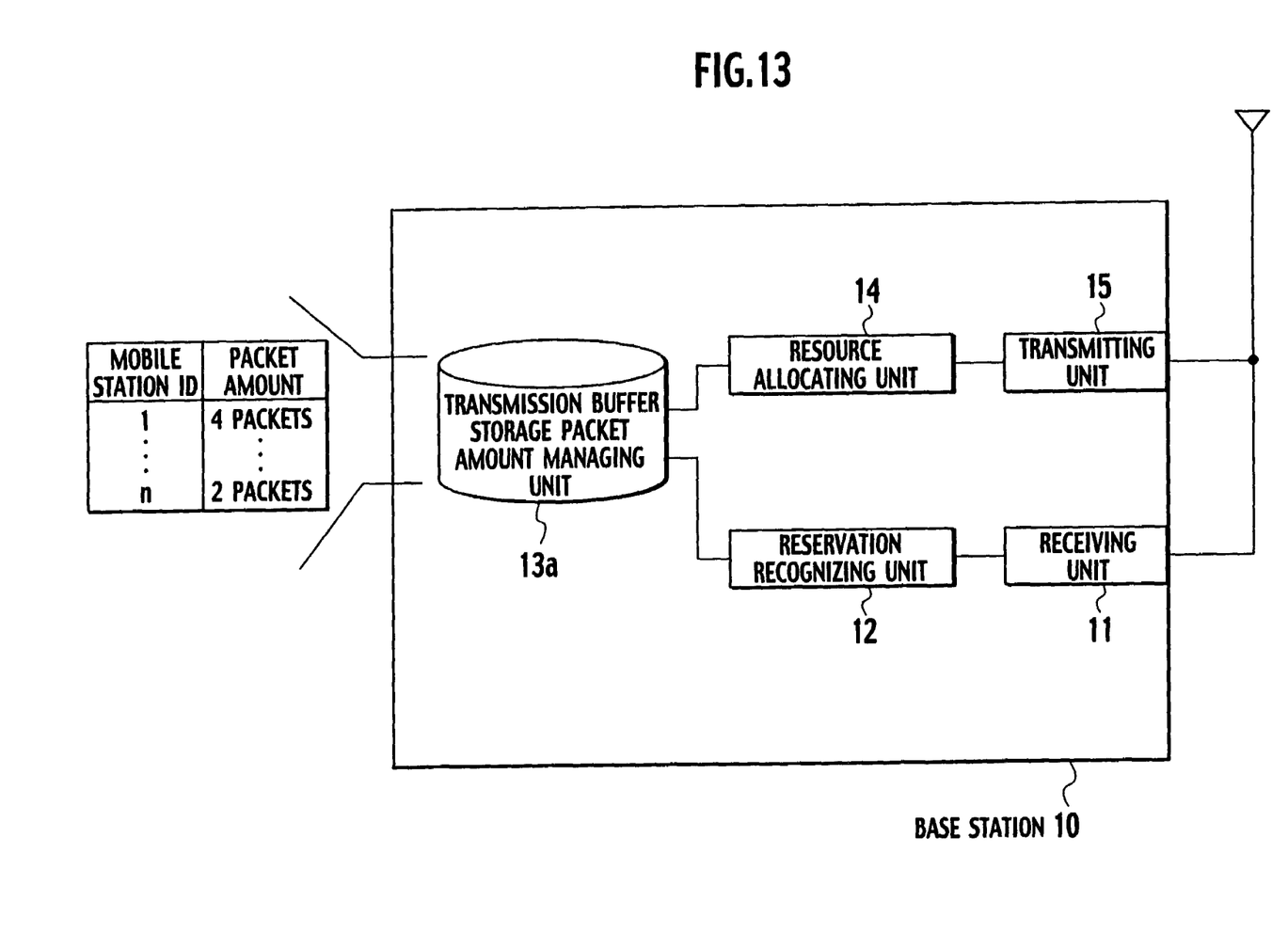
FIG. 13 is functional block diagram of a base station according to a first embodiment of the present invention.

Referring to FIG. 13, a fourth embodiment of the present invention will be described. Hereinafter, mainly, differences between the first embodiment and the fourth embodiment will be described.

As shown in FIG. 13, the base station 10 includes a transmission buffer storage packet amount managing unit 13*a*, instead of the virtual buffer managing unit 13 of the base station 10 according to the first embodiment.

The transmission buffer storage packet amount managing unit 13*a* is configured to manage only an amount of packets (for example, the number of packets) stored in the transmission buffer 35 corresponding to each mobile station 30$_1$ to 30$_n$ by using a table as shown in FIG. 13 and the like, instead of the virtual buffers which are provided in the virtual buffer managing unit 13 according to the first embodiment.

The transmission buffer storage packet amount managing unit 13*a* is configured to change the amount of packets in the table, in accordance with the change result of the amount of packets (the plus reservation or the minus reservation) transmitted from the mobile station 30 like the virtual buffer managing unit 13 according to the first embodiment.

The present invention can perform the efficient scheduling processing and allocate radio resources efficiently in the uplink high-speed packet communications method.

Additional advantages and modifications will readily occur to those skilled in the art. Therefore, the invention in its broader aspects is not limited to the specific details and the representative embodiment shown and described herein. Accordingly, various modifications may be made without departing from the scope of the general inventive concept as defined by the appended claims and their equivalents.

What is claimed is:

1. A packet communications method of performing packet communications between a mobile station and a base station, the packet communications method comprising:

managing, in the base station, an amount of packets stored in a transmission buffer of the mobile station, wherein the transmission buffer stores packets to be transmitted to the base station;

notifying, in the mobile station, a changed result of an amount of packets stored in the transmission buffer of the mobile station, when the amount of packets stored in the transmission buffer of the mobile station changes; and changing, in the base station, a managed amount in accordance with the changed result notified from the mobile station.

2. A base station which performs packet communications with a mobile station, the base station comprising:

a manager configured to manage an amount of packets stored in a transmission buffer of the mobile station; and wherein the manager is configured to change a managed amount in accordance with a changed result of an amount of packets stored in the transmission buffer of the mobile station, the changed result being notified from the mobile station when the amount of packets stored in the transmission buffer of the mobile station changes.

3. The base station according to claim 2, wherein the manager is configured to manage a virtual buffer that stores a same amount of packets as the packets stored in the transmission buffer of the mobile station; and the manager is configured to change an amount of the packets stored in the virtual buffer, in accordance with the changed result.

4. The base station according to claim 3, further comprising a resource allocator configured to allocate a radio resource which is used in uplink packet communications with the mobile station, by referring to the virtual buffer corresponding to the mobile station.

5. The base station according to claim 4, wherein the manager is configured to change the amount of the packets stored in the virtual buffer, in accordance with an allocation of the radio resource by the resource allocator.

6. The base station according to claim 3, wherein the manager is configured to delete from the virtual buffer a same number of packets as a number of packets which are received from the mobile station successfully.

7. The base station according to claim 3, wherein the manager is configured to add to the virtual buffer the same amount of packets as an increment amount of the packets stored in the transmission buffer of the mobile station, the increment amount being instructed by the changed result, and the manager is configured to associate an added packets with an additional time of the packets in the virtual buffer.

8. The base station according to claim 7, wherein the manager is configured to delete packets which have elapsed for a predetermined period since the packets were stored in the virtual buffer, by referring to the additional time.

9. The base station according to claim 7, wherein the manager is configured to associate the additional time with communication quality information of the packets notified from the mobile station; and the base station further comprises a scheduler configured to perform scheduling processing of an allocation of a radio resource which is used in uplink packet communications with the mobile station, in accordance with the communication quality information.

10. A mobile station which performs packet communications with a base station, the mobile station comprising:

a transmission buffer configured to store packets to be transmitted to the base station; and a notifier configured to notify a change result of an amount of packets stored in the transmission buffer to the base station, when the amount of packets stored in the transmission buffer changes, wherein the notifier is configured to notify the number of packets which have been generated to be transmitted to the base station, as the change result showing an increment amount of packets stored in the transmission buffer.

11. A mobile station which performs packet communications with a base station, the mobile station comprising:

a transmission buffer configured to store packets to be transmitted to the base station; and a notifier configured to notify a change result of an amount of packets stored in the transmission buffer to the base station, when the amount of packets stored in the transmission buffer changes, wherein the notifier is configured to notify the number of packets which have been discarded in the transmission buffer, as the change result showing an decrement amount of packets stored in the transmission buffer.

12. A mobile station which performs packet communications with a base station, the mobile station comprising:

a transmission buffer configured to store packets to be transmitted to the base station; and a notifier configured to notify a change result of an amount of packets stored in the transmission buffer to the base station, when the amount of packets stored in the transmission buffer changes, wherein the notifier is configured to notify the number of packets which have been transmitted to the base station successfully, as the change result showing an decrement amount of packets stored in the transmission buffer.

13. A mobile station which performs packet communications with a base station, the mobile station comprising:

a transmission buffer configured to store packets to be transmitted to the base station; and a notifier configured to notify a change result of an amount of packets stored in the transmission buffer to the base station, when the amount of packets stored in the transmission buffer changes, wherein the notifier is configured to notify the number of packets which have been generated to be re-transmitted to the base station, as the change result showing an increment amount of packets stored in the transmission buffer.

* * * * *